(No Model.)

M. B. TOTTEN.
FRUIT CUTTER.

No. 580,563. Patented Apr. 13, 1897.

Witnesses,

Inventor,
Marco B. Totten
By Dewey & Co.
Attys

UNITED STATES PATENT OFFICE.

MARCO B. TOTTEN, OF COLUSA, CALIFORNIA, ASSIGNOR OF ONE-THIRD TO JOSEPH B. COOKE, OF SAME PLACE.

FRUIT-CUTTER.

SPECIFICATION forming part of Letters Patent No. 580,563, dated April 13, 1897.

Application filed September 30, 1896. Serial No. 607,409. (No model.)

*To all whom it may concern:*

Be it known that I, MARCO B. TOTTEN, a citizen of the United States, residing at Colusa, county of Colusa, State of California, have invented an Improvement in Fruit-Cutters; and I hereby declare the following to be a full, clear, and exact description of the same.

My invention relates to the class of hand implements or tools for cutting fruit whereby their pits may be removed preparatory to drying.

My invention consists in the parts and the constructions and combinations of parts hereinafter described and claimed.

The object of my invention is to provide a simple and effective hand instrument which will cut through the flesh of the fruit—as, for example, a freestone peach or apricot—and will grasp the pit firmly in such a manner that the operator can with his hand easily remove the divided sections of fruit from the pit, which is still held by the blades.

Figure 1:
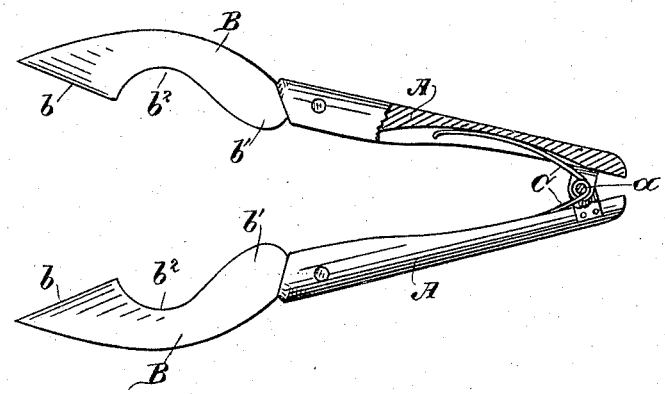
Figure 2:
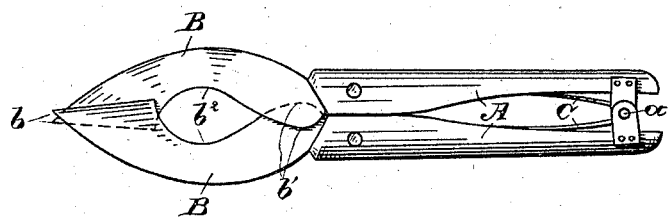

Referring to the accompanying drawings, Figure 1 is a view of my fruit-cutter in an open position. Fig. 2 is a view of same in a closed position.

A are handles carrying blades B. The handles are pivoted together in any suitable manner at $a$, and they are controlled by a spring C of any suitable character and arranged to hold the blades normally separated, so that the operator by grasping the handles can force the blades together and by relieving his grasp said blades will separate automatically. Each blade B has for its cutting edge what I may term a "point" $b$ and a "heel" $b'$ and between these parts a curved or recessed portion, as shown at $b^2$.

In the best form of the device the relative positions of the blades are such that when closed the heel and point of one blade shall be on relatively opposite sides of the other blade, that is to say, that the heel of one blade overlaps the heel of the other blade on one side, while the point of the first-named overlaps the point of the last-named blade on the other side.

In the operation of this instrument the fruit is held in one hand and the operator causes the blades B to close upon it longitudinally. The blades cut through the flesh of the fruit, and the curved or recessed portions $b^2$ embrace and encircle the pit or stone thereof and hold it tight, while the operator can now with his hand remove the severed sections of fruit while still holding the pit, and thereupon by releasing the handles the blades will open and permit the stone to fall out.

The advantage in the peculiar overlapping of the blades which I have described is that they are more rigid and grasp the pit more firmly. The crossing of the blades also prevents them from springing sidewise while holding the pit and thereby injuring the instrument. A small pit would be more likely to spring the blades than a large one, but on a small one the blades may lap farther, thus giving them more rigidity and firmness where most required; also, by preventing the blades from springing they can be made harder with less danger of breaking and not require sharpening so frequently.

Having thus described my invention, what I claim as new, and desire to secure by Letters Patent, is—

1. A fruit-cutter comprising opposing blades each having a distinct cutting edge at its point and heel and an intervening cutting edge of curved or recessed form adapted to embrace and hold the pit while the severed sections of fruit are being removed, said blades being arranged to overlap at the point and heel on opposite sides to prevent the blades springing sidewise while holding the pit.

2. A fruit-cutter comprising handles pivoted at their rear ends, a spring acting upon said handles to hold them apart, and blades carried by said handles, having each a cutting edge at its point and at its heel and a concave intermediate portion between said edges having its cutting edge merging into the cutting edges at point and heel.

3. A fruit-cutter comprising pivoted handles, a spring for controlling them and blades carried by said handles, each blade having a cutting edge formed with a point and a heel portion and an intervening curved or recessed portion, said blades being arranged to cause the point and heel of one to overlap the point and heel of the other on opposite sides, when said blades are closed together.

In witness whereof I have hereunto set my hand.

MARCO B. TOTTEN.

Witnesses:
 FRANK L. HOFSAS,
 W. B. COOKE.